United States Patent

Dang et al.

[11] Patent Number: 5,953,304
[45] Date of Patent: Sep. 14, 1999

[54] OPTICAL DISC RECORDING OR PLAYBACK DEVICE WITH CORRECTED FOCUS OPTICAL SCANNING

[75] Inventors: Lieu Kim Dang; Christian Buechler, both of Villingen-Schwenningen, Germany

[73] Assignee: Deutsche Thomson-Brandt GmbH, Villingen-Schwenningen, Germany

[21] Appl. No.: 08/919,937

[22] Filed: Aug. 28, 1997

[30] Foreign Application Priority Data

Sep. 23, 1996 [DE] Germany .................... 196 38 878

[51] Int. Cl.$^6$ .................................................. G11B 7/00
[52] U.S. Cl. ................................. 369/109; 369/103
[58] Field of Search .............................. 369/112, 109, 369/110, 103, 44.23, 44.24, 44.12, 44.41, 44.42

[56] References Cited

U.S. PATENT DOCUMENTS

| | | | |
|---|---|---|---|
| 5,015,835 | 5/1991 | Ohuchida et al. | 250/201.5 |
| 5,036,185 | 7/1991 | Ando | 369/44.24 |
| 5,060,212 | 10/1991 | Fujita et al. | 369/44.12 |
| 5,101,389 | 3/1992 | Ohuchida et al. | |
| 5,105,411 | 4/1992 | Ishika | 369/44.24 |
| 5,161,139 | 11/1992 | Inoue et al. | 369/44.24 |
| 5,278,817 | 1/1994 | Maeda et al. | 369/109 |
| 5,283,772 | 2/1994 | Miyka et al. | |
| 5,315,574 | 5/1994 | Saimi et al. | 369/109 |
| 5,351,230 | 9/1994 | Takeda et al. | 369/112 |
| 5,493,555 | 2/1996 | Kimura et al. | |
| 5,532,987 | 7/1996 | Fujita et al. | 369/44.24 |
| 5,559,767 | 9/1996 | Matsui | 369/112 |
| 5,638,352 | 6/1997 | Yang | 369/112 |
| 5,742,572 | 3/1996 | Tezuka et al. | 369/44.23 |
| 5,793,725 | 8/1998 | Tezuka et al. | 369/112 |
| 5,850,380 | 12/1998 | Kudo | 369/109 |

FOREIGN PATENT DOCUMENTS

| | | |
|---|---|---|
| 0452793 A2 | 10/1991 | European Pat. Off. . |
| WO 97/23871 | 7/1997 | WIPO . |

*Primary Examiner*—Nabil Hindi
*Attorney, Agent, or Firm*—Joseph S. Tripoli; Peter M. Emanuel; Paul P. Kiel

[57] ABSTRACT

A device for corrected-focus scanning of information while recording on and/or replaying information from a recording medium is based on a radiation source which provides a scanning beam, a focusing objective lens and a radiation-sensitive detector system. A diffraction element for deriving a focus error signal is arranged in the space between the focusing objective lens and the detector system, at a predetermined, fixed distance, the diffraction element being designed such that two focus planes result which are physically separated from one another. The detector system is located between the separate focus planes such that the size ratios, which change in the event of defocusing, of the symmetrically imaged focus spot can be used to derive the focus error signal.

19 Claims, 5 Drawing Sheets

OPTICAL DISC RECORDING OR PLAYBACK DEVICE WITH CORRECTED FOCUS OPTICAL SCANNING

BACKGROUND OF THE INVENTION

1. Field of the Invention

The invention relates to a recording or replay device for corrected-focus optical scanning when recording on or replaying information from an optical recording medium, containing a radiation source which provides a scanning beam, a focusing objective lens as well as a radiation-sensitive detector system which essentially lies on a plane, and at least one diffraction element for producing auxiliary beams for deriving a focus error signal.

2. Description of the Prior Art

It is known, when playing back from optical recording media, so-called compact disks or CDs, for digital information to be read with the aid of optoelectronic scanning system, projections or depressions, the so-called pits, which are arranged on the data medium being detected without any contact by means of a focused light beam from a light source, for example a semiconductor laser, when the optical recording medium is rotating at speeds from 200 to 500 revolutions per minute. The light beam which is produced by the radiation source is passed to the optical recording medium via an optical system which may have mirrors, lens and/or prisms. When the light beam strikes a pit, diffraction and/or interference phenomena occur in contrast to reflection on a plane or on the surface between the individual pits, and these phenomena lead to modulation of the reflected light beam. The light beam, modulated by the existing information pattern of the recording medium, is then passed to a detector system, for a example a photodiode, via a semireflective prism or the like. The detector system is used to convert the modulated light beam into electrical signals, from which downstream evaluation electronics are used to obtain the information which is present on the recording medium, for further processing. An electronic servo circuit ensures the tracking of the light beam in such a manner that said light beam follows the track of pits accurately, and in such a manner that, in spite of any unevenness of the recording medium which normally cannot be avoided, and any other mechanical or thermal disturbances, this light beam is focused with high precision onto the layer of the recording medium that carries the information.

EP-0 373 699 B1 discloses an optical scanning device which, inter alia, achieves the object of obtaining a focus error signal from the optical signal, so that the desired focus readjustment can be carried out with appropriate accuracy.

It is proposed for this purpose that a mirror objective be designed which has two opposite surfaces and is used to focus the radiation from a laser source onto the CD, the surface which faces the radiation source having a radiation window which lies around the optical axis of the mirror objective, and having a reflector which surrounds this window. The second surface, which faces away from the radiation source, has a reflector which lies symmetrically around the optical axis, and has a radiation window which surrounds this reflector.

The first radiation window is fitted with a first diffraction element, for example a grating, in order to obtain a scanning beam and two auxiliary beams from the beam supplied by the radiation source. The second reflector is fitted with a second diffraction element, in order that part of the radiation which is reflected by the object to be scanned and passes through the mirror objective once again can be deflected in the direction of a radiation-sensitive detection system. This part of the scanning beam is deformed by the diffraction element such that a focus error signal FES can be derived with the aid of the detection system. The auxiliary beams, which are received by the first diffraction element, allow track control to be carried out, that is to say track control on the basis of a track error signal TES.

The focus error signal obtained with the aid of the second diffraction element and the detection system indicates the magnitude and the direction of any error in the instantaneous focus plane with respect to the mirror objective, it being possible to use this error signal for tracking the laser radiation, for example by means of a focusing coil.

By using a diffraction element having two grating elements, which split the light beam into two beam elements, and using two detector pairs, it is possible by determining the change in the position of focus spots on the detectors to check the extent of any focus error of the light beam with respect to the layer which carries the information. The output signals of the detectors are compared to obtain a parameter for assessing the focus error which, as described, can be used for regulation.

The grating used for the method according to EP 0 373 699 B1 described above is a diffraction grating having two grating elements, which split the diffracted beam into the said beam elements, the detection system comprising detector pairs, and a first and a second beam element, respectively, interacting with a first and a second detector pair, respectively. The grating elements, which touch at one edge, act like an edge which is used in the so-called Foucault method, that is also called a knife edge, the rows of focus spots produced by the gratings in each case lying in the same focus plane, and the error between the focus spot and a predetermined point or a predetermined line representing the size of the focus error.

As a result of the fact that the servo light beam is focused onto the detector system in the Foucault method, the focus error signal obtained has only an inadequate signal-to-noise ratio, so that relatively sensitive detectors have to be used or the complexity of a downstream electronic circuit is increased. Furthermore, the focus error signal based on the Foucault method is sensitive to position changes between the optical system and the detectors, which results in an increased error rate.

DE 44 42 976 A1 discloses a device for non-touching optical scanning of information, the basis of this once again being a light source which transmits light to one of the recording tracks and has a detector arrangement which receives light reflected from the recording track. A beam splitter and an objective lens are located in the beam path between the light source and the detector arrangement. In addition, arranged between the light source and the beam splitter there is a micro-mirror whose mirror surface can be deformed and/or swivelled by means of a drive, by which means it is possible to vary the incidence angle and/or the incidence point of the light beam passing from the light source, via the micro-mirror to the beam splitter, the objective lens and the recording track, as a function of the swivel position and/or deformation of the micro-mirror. This is intended to enable quicker and more accurate track finding and tracking with less complexity. According to DE 44 42 976 A1, the beam splitter may be formed by a holographic element which, on one side of a glass substrate, has a hologram for splitting the light beam reflected from the recording track into beam elements. The hologram is split into a first region with a narrow grating structure and into a second region with a broader grating structure, by which means the beam reflected from the recording track is split into the said beam elements, which strike different area regions of a detector arrangement, in order that, in this way, it is possible to evaluate them both independently for obtaining signals for tracking and for focusing. The beam element, which is produced by small hologram grating spacings, is imaged on a dividing line between two detection areas. The beam element of the main beam produced by large hologram grating spacings is directed at a further detection area. The beam element produced by the small grating spacings, which is passed to two adjacent and opposite detection areas, is used to derive the focus error signal for controlling the drive for the optics by detecting the respective spot light intensities. The beam elements are thus split and imaged onto in each case two detection areas, in order use the intensity difference between the two areas to deduce the focus error. The disadvantages of the solution according to DE 44 42 976 A1 are as follows.

As a result of the beam elements being imaged in one focus plane, the intensity of the focus spots is low so that, particularly when the scanning beam is in a focused position, the signal obtained from detectors has an unfavorable signal-to-noise ratio.

The object of the invention is thus to specify a device for corrected-focus optical scanning or recording of information from or, respectively onto a recording medium, which device uses a simple optical scanning system to allow it to supply focus error signals with a favorable signal-to-noise ratio and which allows it to operate with a less sensitive detector system, as a result of which the costs for implementation of such a scanning device are reduced, in particular by the adjustment complexity being reduced.

The object of the invention is achieved by an object according to the features of Patent claim 1, advantageous refinements and developments being specified in the subclaims.

SUMMARY OF THE INVENTION

According to a first basic idea of the invention, the device for corrected-focus optical scanning of an optical recording medium has a diffraction element which is located in the space between the objective lens and a detector system, at a predetermined, fixed distance. The diffraction element is in this case designed such that two focus planes, which are physically separated from one another, result from the radiation reflected from the recording medium. According to the invention, the detector system is arranged between the separate focus planes such that the size ratios, which change in the event of defocusing, of the symmetrically imaged focus spot can be used to derive the focus error signal. The objective lens, the diffraction element and the detector system are advantageously arranged along a common optical axis. A different optical element, for example a hologram, which has corresponding optical characteristics can also be used advantageously instead of an objective lens.

In a preferred embodiment, the diffraction element is composed of two essentially planar phase grating plates having different optical thickness and different grating constants. Phase grating plates offer the advantage that they modulate the phase of the incident light, but do not influence its intensity.

The different optical thickness is achieved, for example, by using a homogeneous material with regions of different geometric thickness. Another possibility for achieving different optical thickness is to use materials with refractive indices that differ from one another, which makes it possible for the plate to have a uniform geometric thickness. These phase grating plates, which are located in the beam path between the collector lens and the detector, are used to split the reflected radiation in the scanning system, to obtain one or more pairs of focus spots. The respective outer focus spot of a pair, that is to say the spot which is further away from the optical axis, in this case results from the grating plate having the smaller grating constant while, in contrast, the respective inner focus spots are produced by the grating having the larger grating constant. The phase grating plates are essentially parallel to the plane of the detector system.

According to a further preferred embodiment, two grating plates with a grating having the same grating constants are used as the diffraction element instead of two grating plates having different grating constants, the grating surfaces being arranged on respectively opposite surfaces of the diffraction element. They are thus spaced apart from one another in the propagation direction of the light beam, that is to say in the direction of the optical axis. This has the same effect as gratings which have different grating constants and are not spaced apart.

According to the invention, the choice of the grating constants and the ratios of the grating constants to one another can be used to determine the position and the lateral distance between the focus spot pairs, so that optimized detector systems can be used.

The detector system that is used preferably comprises a multi-quadrant arrangement of radiation-sensitive elements, for example photodiodes, for imaging or detecting the focus spots.

According to a further basic idea of the invention, the diffraction element comprises two phase plates of different optical thickness, the plates having a common edge and being rotated through an angle of less than 90° to the incident beam direction. The rotation axis runs essentially at right angles to the common edge of the plates and at right angles to the optical axis of the incident beam, so that focus spots which are spaced apart from one another are likewise produced. In one advantageous embodiment according to this basic idea of the invention, the diffraction element may have plates of the same thickness, but with a different refractive index. In this way as well, it is advantageously possible to achieve a phase change in the light path without modulating its amplitude. The phase plates to be used are optically transparent.

According to the invention, the plate surfaces of each plate are additionally provided with in each case one polarization layer, the polarization directions being at right angles to one another. This has the advantage that such a device is suitable, for example, for scanning magneto-optical recording media. In the case of such media, the polarization direction of the reflected light is used to transmit the stored information.

By means of the device according to the invention for corrected-focus optical scanning of information while recording on and/or replaying information from an optical recording medium, it is possible to use multi-quadrant detector systems in a simple manner to derive a difference signal, for example a focus error signal, of high amplitude with a high signal-to-noise ratio, it being possible to derive the information signal from the sum of the individual intensities. By using a simple optical arrangement, it is possible by means of a diffraction element to split the beam reflected from the recording track into beam elements without any complex adjustment, undesirable secondary beams being reduced. These undesirable secondary beams are beams which are not required to form the signal, for example zero-order beams or beams of an order more than one. The zero-order beam can, for example, be greatly reduced in a phase grating by the grooves having a suitable depth, and the use of a suitable hologram also has the corresponding effect. However, in general, it is possible to tolerate the presence of a zero-order portion.

It is thus advantageously at the same time possible to derive a predetermined tracking signal, the so-called ATIP signal, for optical recording media which can be written to, for example a magneto-optical disk, using a further detector arrangement arranged on the same plane as the detector system.

The diffraction elements or plates used of different optical thickness can be manufactured economically and easily, so that the overall production costs of the scanning device are reduced.

The focus error signal FES for controlling the drive of the focusing optics or of the focusing objective lens is obtained by evaluating the focus spots, the focus spots lying on two planes which are physically separated from one another, because of the different optical path lengths through the diffraction element or the plates.

The diffraction element in each case allows only first diffraction orders to pass, the focus spots being of equal intensity when focused. This can be achieved, for example, with a suitable arrangement of the layout using hologram technology, by which means the zero-order portion can be reduced.

The detector system is arranged between the two focus planes such that essentially semicircular focus spots of the same size are formed in the so-called in-focus case when the scanning beam is focused on the layer of the optical recording medium which carries the information. When defocused, both focus planes are shifted in the same direction relative to the detector system, one focus plane moving closer to the detector and the other further away from it as a result of the stationary position of the detector system. The focus spots in one row thus becomes smaller while, in contrast, those in the other row become larger, by which means the focus error signal can be determined, using a detector arrangement preferably having four quadrants, by forming sums and differences between corresponding individual detectors.

BRIEF DESCRIPTION OF THE DRAWINGS

It is intended to explain the invention in more detail in the following text with reference to exemplary embodiments and with the assistance of figures, in which.

DESCRIPTION OF THE PREFERRED EMBODIMENT

Figure 1:
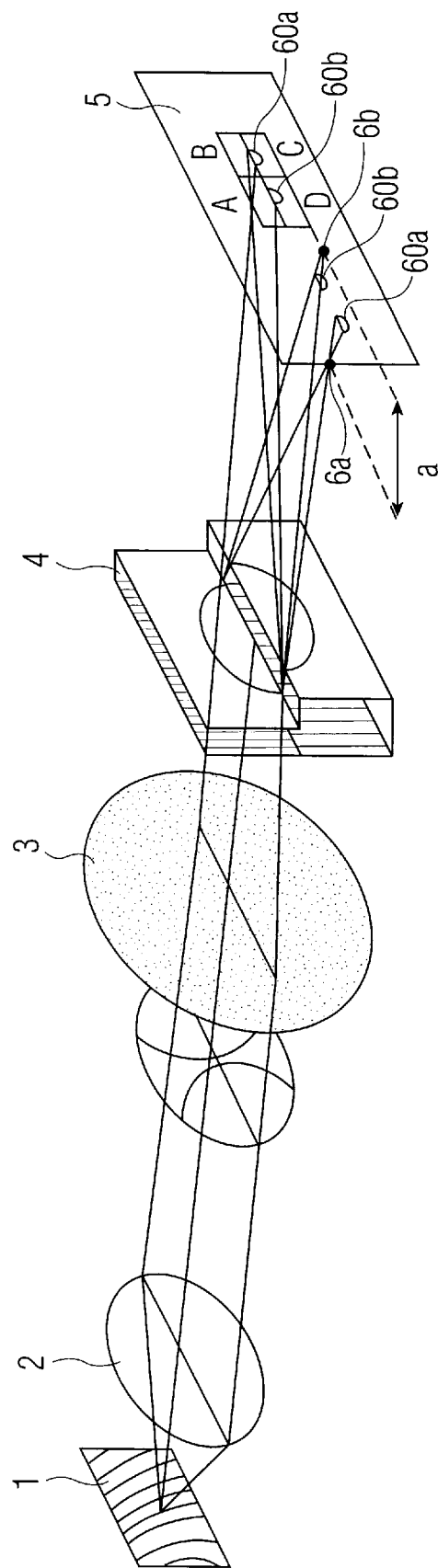
FIG. 1 shows a first exemplary embodiment of the device according to the invention, having a device for corrected-focus optical scanning with a hologram diffraction element in the form of phase grating plates of different thickness and with a different grating constant.

The first exemplary embodiment, which is shown in FIG. 1, is based on a device according to the invention which has a radiation source which is not shown but produces a scanning beam, the scanning beam passing via a beam splitter to an optical recording medium 1, for example a CD. The light reflected from the recording medium 1 is passed via an objective lens 2 and a convergent lens 3 to a diffraction element 4.

When the recording tracks on the recording medium 1 are scanned, the incident light is totally reflected and its intensity or phase is modulated, before it passes through the objective lens 2 and the convergent lens 3 to the diffraction element 4 which can be formed, for example, by a hologram. The diffraction element 4 deflects the reflected light beams in the direction of the detector system 5. The diffracted beams are in this case ±1st order.

The detector system 5 receives these beams and produces signals which, on the one hand, represent the recorded information and, on the other hand, represent control signals for tracking the convergent lens 3 and/or the objective lens 2. The objective lens 2 can be displaced by means of a drive, which is not shown, such that the beam is focused onto the respective recording track of the recording medium 1.

In the case of the first exemplary embodiment, which is shown in FIG. 1, the diffraction element 4 is located in the space between the objective lens 2 or the convergent lens 3 and the detector system 5, the abovementioned assemblies being arranged along a common optical axis. The diffraction element 4 is designed such that two focus planes 7a, 7b result which are physically separated from one another and are at a distance a apart, the detector system 5 being arranged between the separate focus planes 7a, 7b that are formed, such that the changing size relationships of symmetrically imaged focus spots 6a, 6b in the event of defocusing can be used to derive a focus error signal. The detector system 5 and the diffraction system 4 are preferably aligned parallel to one another.

The diffraction element 4 comprises two essentially planar phase grating plates 4a and 4b with a different optical thickness and with different grating constants. The two phase grating plates 4a, 4b touch at one edge, but may also be at a small, uniform distance apart. This distance may be produced, for example, by means of an adhesive layer or the like connecting the plates 4a, 4b.

The embodiment of the diffraction element 4 described above, with grating plates 4a, 4b of different thickness, results in two rows of focus spots 6a, 6b being formed as a result of the different optical path lengths of the beam through the plates, the focus spots 6a, 6b being located, as mentioned, on focus planes 7a, 7b which are physically separated from one another.

The phase grating plates 4a, 4b are provided with a grating with an appropriate groove depth in such a manner that only first diffraction orders occur and the focus spots in the in-focus case essentially have the same intensities as one another. That is to say, the focus spots produced by different gratings have the same intensity when they are correctly focused.

Figure 2:
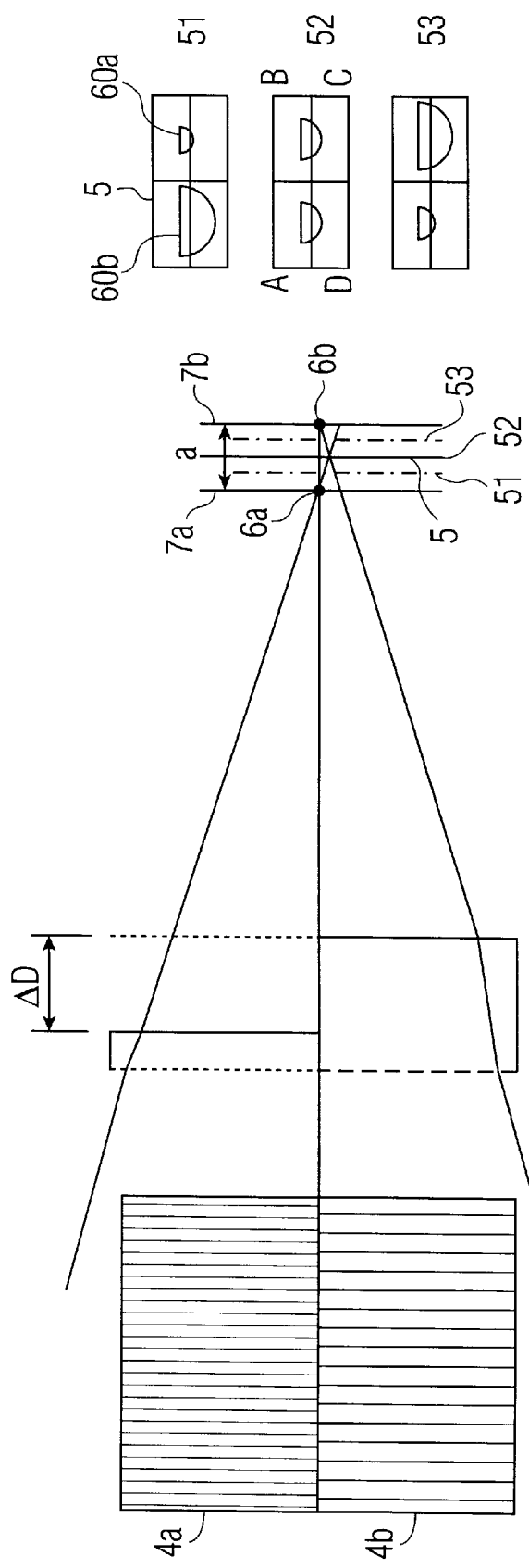
FIG. 2 shows an outline illustration of the beam path through the hologram diffraction element according to FIG. 1 and the focus planes formed at a distance from one another, as well a plan view of focus spots imaged on a detector system, in the focused and defocused cases.

If defocused, the focus planes 7a, 7b shown in FIG. 2 are displaced in the same direction with respect to the detector system 5. In this case, one plane moves closer to the detector system 5 while the other plane moves further away from the detector system 5, to the same extent. In consequence, the essentially semicircular focus spots in one row of spots become smaller, and those in the other row become larger.

FIG. 2 shows the relative positions of the detector system 5 and the focus planes 7a, 7b for a focused state and for two defocused states. In this case, for the sake of simplicity, the position of the detector system 5 is shown displaced with respect to the focus planes 7a, 7b. Position 52 of the detector system 5 corresponds to the focus state, and positions 51 and 53 each correspond to a defocused state. The corresponding light spots 60a, 60b which strike the detector system 5 are shown in the right-hand part of FIG. 2, the different positions 51, 52, 53 being indicated. In the focused state, that is to say in position 52, the light spots 60a and 60b are the same size since the two focus planes 7a, 7b are at the same distance from the detector system 5. The light spots 60a, 60b both have a roughly semicircular appearance since the light beam, which is assumed to have a circular cross-section and is reflected from the recording medium 1, strikes the diffraction element 4 as centrally as possible. That is to say, the two grating plates 4a and 4b are struck by in each case one part of the light beam, which parts have a roughly semicircular cross-section and are roughly the same size. Since the focus plane 7a is located in front of the detector system 5, the light spot 60a is formed as a reversed mirror image, that is to say the two light spots 60a, 60b are formed as lower semicircles in the exemplary embodiment. Any relative displacement of the detector system 5 and the focus planes 7a, 7b, as indicated at positions 51 and 53, leads to the size of the light spots 60a, 60b changing, the upper, straight-line boundary, which corresponds to the boundary between the two gratings with different grating constants, remaining roughly at the same level. In consequence, the relative illumination intensity of the individual detectors A, B, C, D of the detector system 5 changes.

A focus error signal FES can in this case be formed as a difference signal from the signals emitted from the detectors A, B, C, D:

FES=(A+C)−(B+D)

A, B, C and D represent the electrical signals from the individual detectors A, B, C and D of the detector system. The distance a according to FIG. 2 between the focus planes 7a, 7b is caused by the difference in thickness ΔD of the two grating plates and is given by:

$$a = \frac{n-1}{n} * \Delta D$$

where n is the refractive index, which is in this case assumed to be the same for both grating plates 4a and 4b.

The choice of the grating constants of the grating plates 4a, 4b of the diffraction element 4 allows the distances between the focus spots 6a, 6b to be adjusted or influenced. The light spots 60a, 60b are imaged on the detector system 5 in FIG. 1 in such a manner that the outer light spots 60a are produced by the grating 4a, that is to say the grating having the smaller grating constant. The inner light spots 60b result from the grating 4b having the larger grating constant.

Figure 3A:
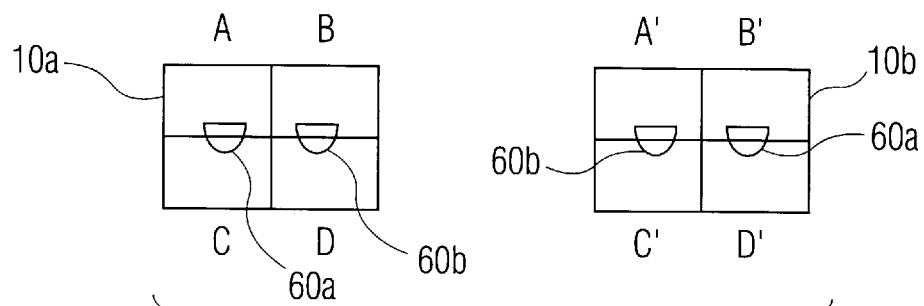
FIG. 3a shows an arrangement of two four-quadrant detectors, spaced apart from one another, for obtaining a larger difference signal.

FIG. 3a shows an arrangement of a detector system using two four-quadrant detectors 10a, 10b. These four-quadrant detectors 10a, 10b are arranged spaced apart from one another in such a manner that in each case one pair of inner and outer light spots 60b and 60a can be imaged.

The focus error signal FES can then be derived as a distinct difference signal from the following relationship:

FES=(A+D)−(B+C) or FES=(A+C)−(B+D).

The focus error signal FES is doubled by the inclusion of two four-quadrant detectors. The two ±1st order beams are thus used optimally.

Figure 3B:
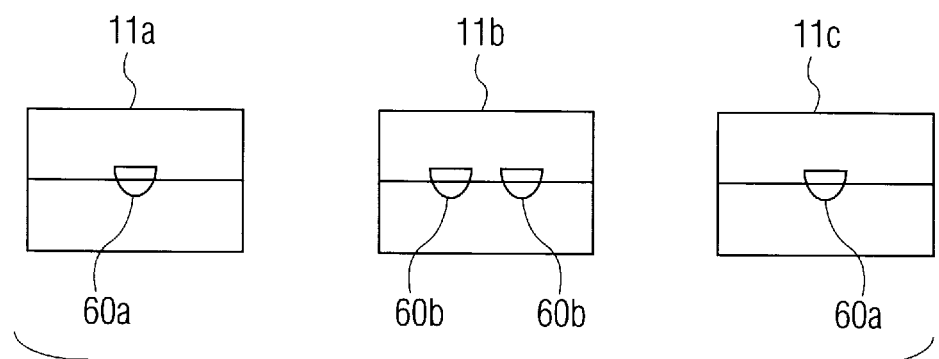
FIG. 3b shows an arrangement of three two-quadrant detectors for closely adjacent inner focus spots.

Setting or choosing the grating constants allows the inner, mutually opposite light spots 60b to assume a closely adjacent position, as illustrated in principle in FIG. 3b. In this case, it is assumed that there are no zero-order beams. In this case, three two-quadrant detectors 11a to 11c or six correspondingly arranged individual diodes may be used.

Figure 4:
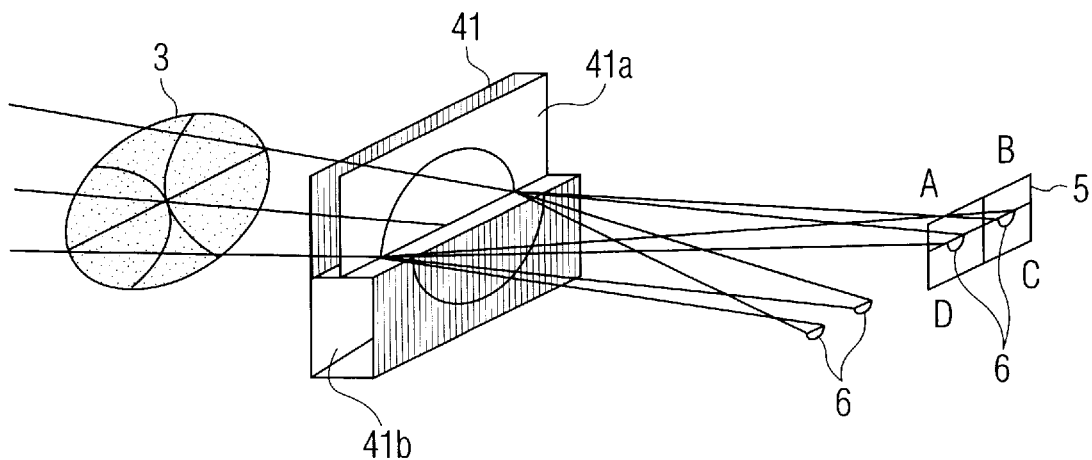
FIG. 4 shows a second exemplary embodiment having a hologram diffraction element with grating plates with the same grating constant and of different thickness, the gratings being applied to opposite surfaces of the diffraction element, however.

The second exemplary embodiment, according to FIG. 4, is based on a diffraction element 41 which is arranged, in a similar arrangement to that shown in FIG. 1, in the beam path between the convergent lens 3 and the detector system 5.

In contrast to the first exemplary embodiment, the diffraction element comprises grating plates of different thickness but with the same grating constant, the grating of the grating plate 41a being applied on the surface pointing towards the convergent lens 3, and the grating on the grating plate 41b being applied on the surface side pointing towards the detector system 5. Accordingly, the significant factor is that, in the case of the second exemplary embodiment according to FIG. 4, gratings having the same grating constant are located on respective opposite sides of the phase grating plates 41a and 41b.

Figure 5:
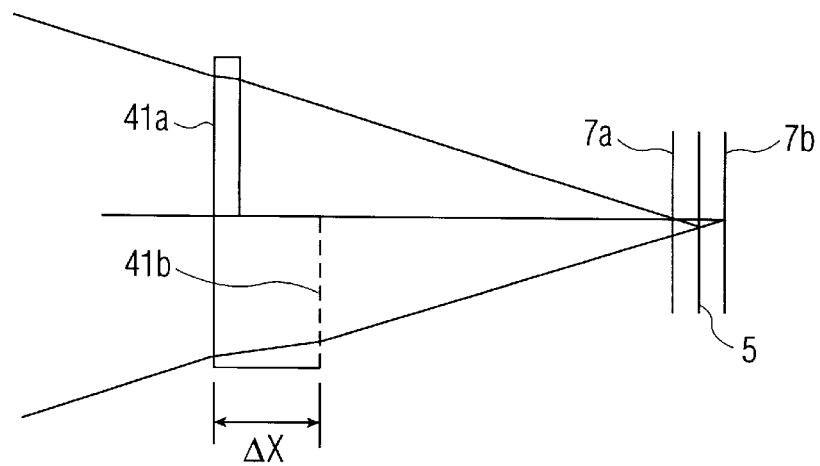
FIG. 5 shows an outline illustration of the second exemplary embodiment with a hologram diffraction element in the form of grating plates of different thickness but with the same grating constant, in a side view in which the focus planes can be seen.

The effects achieved in terms of imaging focus spots on two focus planes 7a and 7b spaced apart from one another will be described in a similar manner to that of FIG. 2, with reference to the basic illustration according to FIG. 5.

In the case of this alternative, second embodiment, the grating plates or phase gratings 41a, 41b thus have the same grating constants. The grating plates 41a, 41b are in this case arranged such that the grating grooves are located on opposite sides of the diffraction element. The grating 41b in this case acts like a grating located on the opposite side of the grating plate 41b and having a different grating constant, which is in this case correspondingly larger.

Figure 6A:
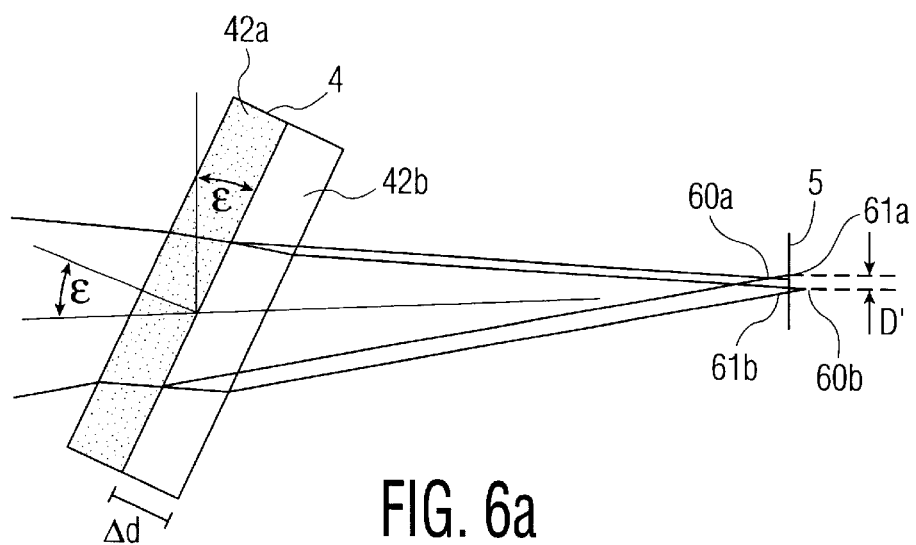
FIG. 6a shows a third exemplary embodiment with a diffraction element in the form of flat plates without grating surfaces, but with a different optical thickness or different refractive index, the flat plates being located in the beam path such that they are rotated or swivelled through an angle.
Figure 6B:
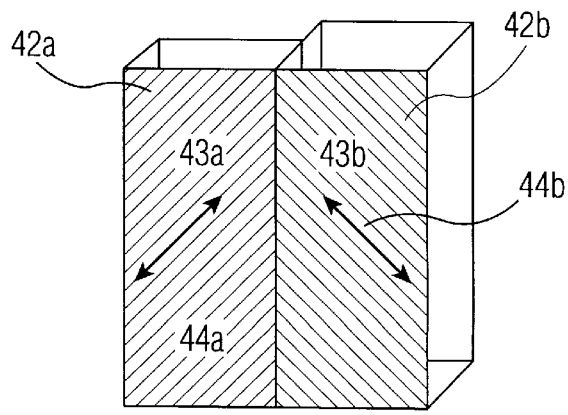
FIG. 6b shows an illustration of flat plates of different thickness and with a polarization coating on one side, the polarization directions being at right angles to one another.
Figure 7:
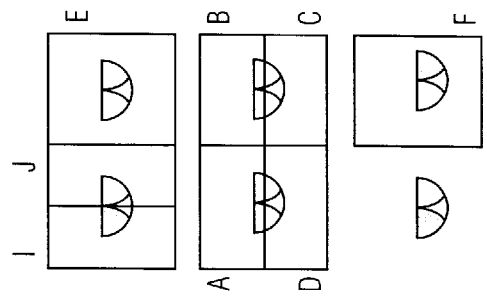
FIG. 7 shows an arrangement of flat plates according to a third exemplary embodiment in a scanning device having an objective lens, and an outline illustration of the focus spots for determining focus errors and further control signals.
Figure 7:
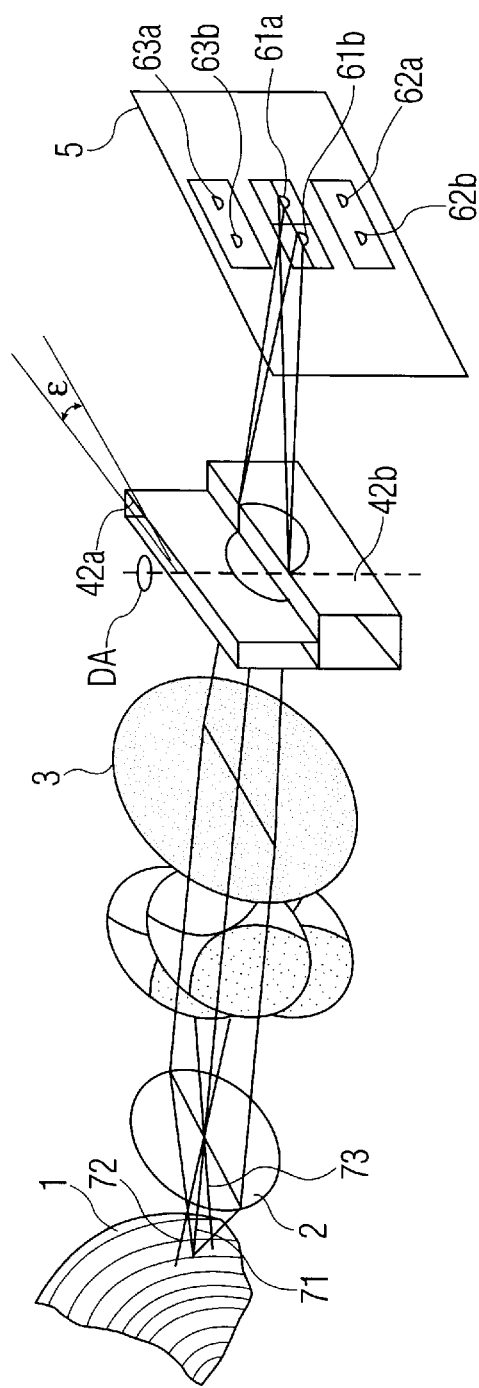

According to a third exemplary embodiment, which is illustrated in FIGS. 6a, 6b and 7, a diffraction element 4 is used which comprises two flat plates 42a and 42b which touch on a common edge or on a common side surface. The flat plates 42a and 42b are positioned obliquely, at an angle ε to the main beam direction. The swivelling or rotation axis DA of the flat plates 42a and 42b, see FIG. 7, is essentially at right angles to the common edge of the plates, and parallel to the plane of the plates.

In the case of the beam path which is illustrated in principle in FIG. 6a, with the arrangement of flat plates 42a and 42b, with a thickness difference of Δd, the distance D* between two focus spots on the detector system 5 is:

$$D^* = \Delta d * \frac{n-1}{n} * \tan\varepsilon$$

where ε is the incidence angle of the optical axis or the rotation angle, and n represents the refractive index of the plates.

FIG. 6b shows flat plates 42a and 42b which are provided with polarization layers 43a, 43b on one of their surfaces located in the beam path. The polarization layers 43a, 43b allow linear-polarized light in the polarization directions indicated by the arrows 44a, 44b to pass, these polarization directions being at right angles to one another. Such coated flat plates 42a and 42b can be used, for example, for devices for writing to or reading from magneto-optical recording media in which the stored information leads to modulation of the polarization of the reflected light beam.

FIG. 7 illustrates the arrangement of flat plates 42a and 42b in a scanning device which has a recording medium 1, and an objective lens 2 and a convergent lens 3. The flat plates 42a and 42b are located in the space between the convergent lens 3 and the detector system 5. The images of light spots 61a, 61b, 62a, 62b, 63a, 63b produced on the detector system can be used to derive error correction and control signals.

The detector system 5 according to FIG. 7 comprises a plurality of detectors. On the one hand, it has a four-quadrant arrangement comprising the detectors A, B, C, D, which is constructed in a similar manner to the detector system described further above. Furthermore, two detectors E and F are illustrated, which are used to produce a track error signal on the basis of the so-called three-beam method. The detectors I and J are provided to allow a tracking signal to be produced for recordable recording media, for example magneto-optical recording media, which are unused, that is to say which are not yet recorded.

The focus error signal FES and the track error signal TES are determined as follows:

FES=(A+C)−(B+D)

TES=E−F.

The track error signal TES in this case corresponds to the signal that is known from the three-beam method. The said method is described only in part here, since it is known to the person skilled in the art. In the case of the three-beam method, two secondary beams 72 and 73, which are in general ±1st order diffraction beams, are produced as well as the main beam 71. These beams are arranged laterally offset in the tracking direction. This is indicated in the top left-hand part of FIG. 7, which shows a detail of a recording medium 1, in the form a disk, with tracks which are indicated not to scale. The main beam 71 is in this case focused on a track, while the secondary beams 72, 73 are arranged offset slightly laterally with respect to the track and leading or lagging the main beam 71 in the track direction. The light spots 62a, 62b and 63a, 63b correspond to the reflected element of the secondary beams 72 and 73. Furthermore, the beam reflected from the recording medium 1 is split to a certain extent by the tracks on said recording medium 1, these tracks likewise forming a diffraction grating. This splitting is indicated in the figure between the objective lens 2 and the convergent lens 3, which figure shows both the cross-sections of the beams 71, 72 and 73 and their respective splitting, caused by the tracks on the recording medium 1. In this case, the ±1st order diffraction beams caused by the tracks are respectively shown only roughly in semicircular form, since only this element passes the boundary of the optical system.

The information signal RF is derived differently depending on the nature of the respectively used recording medium. For recording media which have a pit structure corresponding to that described further above, for example audio CDs, CD-ROMs, so-called phase-change disks and WORM disks, an information signal RF is determined from the sum of the signals from the detectors A, B, C, D, that is to say using the following relationship,

RF=A+B+C+D.

When magneto-optical recording media, so-called MO disks, are used, which influence the polarization of the reflected light beam, the flat plates 42a, 42b are provided with the already mentioned polarization layers 43a, 43b, the polarization directions 44a, 44b of the layers being at right angles to one another.

In this case, the information signal RF is determined used the following relationship:

RF=(A+D)−(B+C).

This signal reflects the rotation of the polarization direction of the reflected light beam caused, for example, by a magneto-optical layer.

In scanning systems for optical recording media which be written to, such as MO, WORM or phase-change recording media, a tracking and/or orientation signal is required, which on the one hand also makes it possible to scan those parts of the recording medium which have not yet been written to, for example to allow them to be written to. On the other hand, this signal makes it possible to obtain information on the point of the recording medium at which the scanning light beam is located. This tracking and/or orientation signal is also called an ATIP signal (Absolute Time In Pregroove), since it is determined from a preformed track, the so-called pregroove. Normally, this signal is obtained from the main beam, and in the exemplary embodiment this would correspond if to the light spots 61a and 61b.

Furthermore related to the exemplary embodiment, this would mean that the detectors A, B, C, D would in each case have to be split once again in the track direction, that is to say in the direction A-D or B-C, so that 8 detectors would be required instead of four, their sum signal being the information signal HF. This would necessitate radio-frequency amplification of 8 detector signals which, on the one hand, represents a high level of circuitry complexity and, on the other hand, would also result in further attenuation of the detector signals, caused by the additional splitting of the detectors. This problem is solved according to the invention in that a part of the secondary beam is used to obtain the ATIP signal. The time shift which occurs in this case as a consequence of the spatial offset between the main beam and the secondary beam that is used to obtain the ATIP signal is in the order of magnitude of 2 μs and, because of the data structure of the ATIP signal, can be ignored.

The ATIP signal is accordingly formed from the signals from the detectors I and J using the following relationship:

ATIP=I−J

The ATIP signal can be described mathematically as follows:

$$ATIP \approx \sin\left[\frac{2\pi}{p} * (a + \text{offset})\right]$$

where p is the track period of the recording medium, that is to say the radial distance between the individual tracks, a is the modulation amplitude of the preformed track and "offset" is the radial offset between the secondary beam 72 or 73 and the track centre of the track being read. The ±1st and −1st order diffraction beams produced by the track of the recording medium 1 strike the detectors I and J, respectively, and their difference is used to determine the ATIP signal. The zero-order beam strikes both detectors I and J with the same intensity and thus contributes only to the offset. The zero order and ±1st order are once again indicated as a semicircle at the edge of the spot in this figure.

The track error signal obtained from the preformed track can be described as follows:

$$TES \approx \sin\left[\frac{2\pi}{p} * \text{offset}\right] * \sin\left[\frac{2\pi x}{p}\right]$$

where x is the instantaneous distance between the main spot and the track. The track error signal has its maximum at offset=p/4, while the ATIP signal is proportional to $\cos(2\pi a/p)$. Since the shift with ATIP modulation is in the order of magnitude of 30 nm in comparison with 1.6 µm for the track period p, the contrast of the ATIP signal is low. This contrast reaches a maximum at offset=p/2. In this case, the track error signal is zero. This means that a specific offset value must be preset in order to achieve a favorable relationship with respect to the signal quality of the TES and ATIP signals. Such an offset value can preferably be in the region of offset=0.6 µm.

With the design of the flat plates according to the third exemplary embodiment, plates of the same thickness can also be used, although they must then have different refractive indices, however.

The device is described in the exemplary embodiments and having a device for corrected-focus optical scanning of information while recording on and/or replaying information from a recording medium can be manufactured economically in an extremely compact form. As a result of the distinct difference signals which are obtained by means of the detector systems and which have a corresponding signal-to-noise ratio, the electronic complexity which is otherwise required for signal amplification and evaluation is unnecessary. The focus error signal obtained is essentially offset-free and is insensitive to detector wander caused by mechanical or thermal effects. Finally, the devices according to the exemplary embodiments allow the number of detectors in the detector system to be reduced in comparison with known solutions.

What is claimed is:

1. Optical recording or replay device, comprising:

a radiation source which provides a scanning beam;

a focusing objective lens;

a radiation-sensitive detector system which essentially lies on a plane; and a diffraction element for deriving a focus error signal the diffraction element having a first subregion which defines a first focus plane, and a second subregion which defines a second focus plane, the focus planes being physically separated from one another, the diffraction element being located in the space between the objective lens and the detector system at a predetermined, fixed distance, the objective lens, the diffraction element and the detector system being arranged along a common optical axis, the detector system being arranged between the separate focus planes, the diffraction element being composed of two essentially planar grating plates having different optical thickness and different grating constants.

2. Optical recording or replay device, comprising:

a radiation source which provides a scanning beam;

a focusing objective lens;

a radiation-sensitive detector system which essentially lies on a plane; and a diffraction element for deriving a focus error signal, the diffraction element having a first subregion which defines a first focus plane, and a second subregion which defines a second focus plane, the focus planes being physically separated from one another, the diffraction element being located in the space between the objective lens and the detector system at a predetermined, fixed distance, the objective lens, the diffraction element and the detector system being arranged along a common optical axis, the detector system being arranged between the separate focus planes, the diffraction element having two planar grating plates having different optical thickness and the same grating constants, the grating surface of a first plate facing the detector system, and the grating surface of the second plate facing away from the detector system.

3. Device according to claim 1, wherein the planes of the grating plates are essentially parallel to the plane of the detector system.

4. Device according to claim 1, wherein the detector system has a multi-quadrant arrangement of radiation-sensitive elements in order to image the focus spot.

5. Device according to claim 4, wherein the detector system has, arranged in one plane, at least two multi-quadrant configurations of radiation-sensitive elements in order to image groups of focus spots.

6. Device according to claim 4, wherein the detector system has a four-quadrant configuration of radiation-sensitive elements.

7. Device according to claim 5, wherein the detector system has a group of three radiation-sensitive elements in a two-quadrant configuration.

8. Optical recording or replay device, comprising:

a radiation source which provides a scanning beam;

a focusing objective lens;

a radiation-sensitive detector system which essentially lies on a plane; and a diffraction element for deriving a focus error signal, the diffraction element having a first subregion which defines a first focus plane, and a second subregion which defines a second focus plane, the focus planes being physically separated from one another, the diffraction element being located in the space between the objective lens and the detector system at a predetermined, fixed distance, the objective lens, the diffraction element and the detector system being arranged along a common optical axis, the detector system being arranged between the separate focus planes, the diffraction element being composed of two flat plates of different optical thickness, the flat plates having a common edge and being rotated through an angle of less than 90° to the incident beam direction, the rotation axis running essentially at right angles to the common edge of the flat plates.

9. Optical recording or replay device, comprising:

a radiation source which provides a scanning beam;

a focusing objective lens;

a radiation-sensitive detector system which essentially lies on a plane; and a diffraction element for deriving a focus error signal, the diffraction element having a first subregion which defines a first focus plane, and a second subregion which defines a second focus plane, the focus planes being physically separated from one another, the diffraction element being located in the space between the objective lens and the detector system at a predetermined, fixed distance, the objective lens, the diffraction element and the detector system being arranged along a common optical axis, the detector system being arranged between the separate focus planes, the diffraction element being composed of two flat plates of the same thickness but with a different diffractive index, which are rotated through an angle of less than 90° to the incident beam direction, the rotation axis running essentially at right angles to the common edge of the flat plates.

10. Device according to claim 8, wherein each one of the plate surfaces of each plate is provided with one polarization layer, the polarization directions of the layers being at right angles to one another.

11. Device according to claim 2, wherein the planes of the grating plates are essentially parallel to the plane of the detector system.

12. Device according to claim 5, wherein the detector system has a four-quadrant configuration of radiation-sensitive elements.

13. Device according to claim 9, wherein each one of the plate surfaces of each plate is provided with one polarization layer, the polarization directions of the layers being at right angles to one another.

14. Device according to claim 2, wherein the detector system has a multi-quadrant arrangement of radiation-sensitive elements in order to image the focus spot.

15. Device according to claim 14, wherein the detector system has, arranged in one plane, at least two multi-quadrant configurations of radiation-sensitive elements in order to image groups of focus spots.

16. Device according to claim 8, wherein the detector system has a multi-quadrant arrangement of radiation-sensitive elements in order to image the focus spot.

17. Device according to claim 16, wherein the detector system has, arranged in one plane, at least two multi-quadrant configurations of radiation-sensitive elements in order to image groups of focus spots.

18. Device according to claim 9, wherein the detector system has a multi-quadrant arrangement of radiation-sensitive elements in order to image the focus spot.

19. Device according to claim 18, wherein the detector system has, arranged in one plane, at least two multi-quadrant configurations of radiation-sensitive elements in order to image groups of focus spots.

* * * * *